(12) United States Patent
Zhang et al.

(10) Patent No.: US 10,954,869 B1
(45) Date of Patent: Mar. 23, 2021

(54) SYSTEM AND METHOD TO REDUCE ENGINE HYDROCARBON EMISSIONS

(71) Applicant: Ford Global Technologies, LLC, Dearborn, MI (US)

(72) Inventors: Xiaogang Zhang, Novi, MI (US); Cindy Zhou, Canton, MI (US); James Yi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/793,459

(22) Filed: Feb. 18, 2020

(51) Int. Cl.
| | | |
|---|---|---|
| *F02D 13/02* | (2006.01) | |
| *F01L 1/047* | (2006.01) | |
| *F02P 5/06* | (2006.01) | |
| *F02D 41/06* | (2006.01) | |
| *F01L 13/00* | (2006.01) | |
| *F02D 41/00* | (2006.01) | |
| *F01L 1/08* | (2006.01) | |

(52) U.S. Cl.
CPC .......... *F02D 13/0273* (2013.01); *F01L 1/047* (2013.01); *F01L 1/08* (2013.01); *F01L 13/0036* (2013.01); *F01L 13/0063* (2013.01); *F02D 13/0246* (2013.01); *F02D 41/009* (2013.01); *F02D 41/064* (2013.01); *F02P 5/06* (2013.01); *F02D 2013/0292* (2013.01); *F02D 2200/101* (2013.01)

(58) Field of Classification Search
CPC ................................................ F02D 13/0273
See application file for complete search history.

(56) References Cited

U.S. PATENT DOCUMENTS

| | | | | |
|---|---|---|---|---|
| 4,424,790 A | * | 1/1984 | Curtil ................... | F02D 13/0269 123/559.1 |
| 5,927,238 A | * | 7/1999 | Watson ............... | F02D 13/0261 123/90.15 |
| 6,807,956 B2 | * | 10/2004 | Gaessler ................ | F02M 26/01 123/568.14 |
| 6,968,825 B2 | * | 11/2005 | Hitomi .................... | F01L 1/053 123/406.11 |
| 7,290,524 B2 | * | 11/2007 | Kobayashi .......... | F02D 13/0273 123/315 |
| 7,565,896 B1 | * | 7/2009 | Yang ....................... | F02D 13/04 123/321 |
| 7,680,584 B2 | * | 3/2010 | Karrelmeyer .......... | F02M 26/01 701/105 |
| 8,065,988 B2 | * | 11/2011 | Hatamura ........... | F02B 23/0672 123/347 |
| 8,307,644 B2 | * | 11/2012 | Kaneko ............... | F02D 41/0002 60/600 |
| 8,447,499 B2 | * | 5/2013 | Gentile ................... | F01L 9/025 701/105 |
| 8,479,509 B2 | * | 7/2013 | Spiegel ............... | F01L 13/0036 60/602 |
| 8,534,261 B2 | * | 9/2013 | Hatamura ................ | F02B 33/34 123/299 |

(Continued)

*Primary Examiner* — Kevin R Steckbauer
(74) *Attorney, Agent, or Firm* — Geoffrey Brumbaugh; McCoy Russell LLP (57) ABSTRACT

Systems and methods for opening and closing exhaust poppet valves of an engine are disclosed. In one example, the exhaust poppet valves may be opened and closed twice during a cycle of an engine via two serially arranged cam lobes that are coupled to a crankshaft so that hydrocarbons may be retained in a cylinder.

18 Claims, 7 Drawing Sheets

(56) References Cited

U.S. PATENT DOCUMENTS

| | | | | |
|---|---|---|---|---|
| 8,627,791 B2* | 1/2014 | Janak | F02M 26/01 | |
| | | | 123/90.16 | |
| 8,930,118 B2* | 1/2015 | Nagatsu | F02D 13/0207 | |
| | | | 701/103 | |
| 9,234,467 B2* | 1/2016 | Ernest | F01L 1/08 | |
| 9,255,539 B2* | 2/2016 | Iwai | F02B 23/101 | |
| 9,334,784 B2* | 5/2016 | Nishimura | F02D 41/029 | |
| 9,394,834 B2* | 7/2016 | Yacoub | F02D 13/06 | |
| 9,429,087 B2* | 8/2016 | Iwai | F02B 23/101 | |
| 9,638,110 B2* | 5/2017 | Minami | F01N 3/035 | |
| 9,765,658 B2* | 9/2017 | Knauf | F01L 1/185 | |
| 9,845,713 B2* | 12/2017 | Ernest | F01L 13/0036 | |
| 9,874,169 B2* | 1/2018 | Nagatsu | F02D 41/3005 | |
| 10,161,321 B2* | 12/2018 | Takamiya | F02D 13/0242 | |
| 10,221,779 B2* | 3/2019 | Ulrey | F02B 25/145 | |
| 10,240,491 B2* | 3/2019 | Shintani | F02D 41/3029 | |
| 10,323,551 B2* | 6/2019 | Gunnarsson | F01L 13/06 | |
| 10,337,427 B2* | 7/2019 | Nagatsu | F02D 13/0207 | |
| 10,480,363 B2* | 11/2019 | Tsunoda | F02D 13/06 | |
| 10,550,772 B1* | 2/2020 | Khan | F01L 1/047 | |
| 10,677,174 B2* | 6/2020 | Ulrey | F02M 26/17 | |
| 2003/0154964 A1* | 8/2003 | Gaessler | F02D 13/0207 | |
| | | | 123/568.14 | |
| 2005/0016496 A1* | 1/2005 | Hitomi | F01L 1/053 | |
| | | | 123/305 | |
| 2005/0252484 A1* | 11/2005 | Vanderpoel | F01L 9/02 | |
| | | | 123/321 | |
| 2006/0144356 A1* | 7/2006 | Sellnau | F02D 13/0257 | |
| | | | 123/90.16 | |
| 2007/0107680 A1* | 5/2007 | Kobayashi | F02D 13/0257 | |
| | | | 123/58.8 | |
| 2009/0024302 A1* | 1/2009 | Karrelmeyer | F02D 13/0273 | |
| | | | 701/103 | |
| 2009/0025697 A1* | 1/2009 | Hatamura | F02M 26/05 | |
| | | | 123/568.11 | |
| 2009/0173062 A1* | 7/2009 | Hu | F01N 3/023 | |
| | | | 60/295 | |
| 2010/0180859 A1* | 7/2010 | Hatamura | F02B 17/00 | |
| | | | 123/295 | |
| 2010/0192882 A1* | 8/2010 | Kaneko | F02P 15/02 | |
| | | | 123/90.15 | |
| 2010/0236237 A1* | 9/2010 | Spiegel | F02D 13/0273 | |
| | | | 60/602 | |
| 2010/0236517 A1* | 9/2010 | Hatamura | F02M 26/34 | |
| | | | 123/299 | |
| 2010/0242878 A1* | 9/2010 | Maekawa | F01L 1/34 | |
| | | | 123/90.16 | |
| 2012/0048218 A1* | 3/2012 | Klingbeil | F02D 13/0269 | |
| | | | 123/90.1 | |
| 2012/0222639 A1* | 9/2012 | Knauf | F02D 13/0211 | |
| | | | 123/90.44 | |
| 2012/0298057 A1* | 11/2012 | Janak | F01L 1/08 | |
| | | | 123/90.12 | |
| 2013/0019828 A1* | 1/2013 | Nagatsu | F02D 41/3035 | |
| | | | 123/90.15 | |
| 2014/0014066 A1* | 1/2014 | Yacoub | F02D 13/06 | |
| | | | 123/406.23 | |
| 2014/0060493 A1* | 3/2014 | Iwai | F02P 5/1516 | |
| | | | 123/478 | |
| 2014/0109848 A1* | 4/2014 | Janak | F01L 1/181 | |
| | | | 123/90.12 | |
| 2014/0373808 A1* | 12/2014 | Ernest | F01L 13/0036 | |
| | | | 123/321 | |
| 2015/0083073 A1* | 3/2015 | Nagatsu | F02D 41/123 | |
| | | | 123/294 | |
| 2015/0226143 A1* | 8/2015 | Iwai | F02D 41/3035 | |
| | | | 123/294 | |
| 2016/0146072 A1* | 5/2016 | Ernest | F02D 13/0273 | |
| | | | 123/90.6 | |
| 2016/0245128 A1* | 8/2016 | Shintani | F02D 13/0219 | |
| 2017/0002702 A1* | 1/2017 | Gunnarsson | F02D 13/0249 | |
| 2017/0074204 A1* | 3/2017 | Takamiya | F02D 41/0007 | |
| 2018/0171885 A1* | 6/2018 | Ulrey | F02D 13/0257 | |
| 2018/0283296 A1* | 10/2018 | Nagatsu | F02D 41/3035 | |
| 2019/0010839 A1* | 1/2019 | Tsunoda | F02D 13/06 | |
| 2019/0153964 A1* | 5/2019 | Ulrey | F02D 13/0215 | |
| 2020/0040774 A1* | 2/2020 | Dahl | F01L 9/023 | |
| 2020/0049080 A1* | 2/2020 | Dahl | F01L 13/06 | |

* cited by examiner

SYSTEM AND METHOD TO REDUCE ENGINE HYDROCARBON EMISSIONS

FIELD

The present disclosure relates to a system and method for reducing hydrocarbon emissions of an internal combustion engine. The system and method may operate exhaust valves via specialized cam lobes during a cold engine start.

BACKGROUND AND SUMMARY

An internal combustion engine may combust hydrocarbons to generate torque. Hydrocarbons that have passed through the cylinder and have been exhausted to the engine's exhaust system may be oxidized when the engine is warm via a catalyst. However, when catalyst temperature is low, the catalyst may lack capacity to oxidize hydrocarbons that may be exhausted from the engine. One such condition may be after an engine cold start. In addition, engine hydrocarbon emissions during cold starting may be higher than when the engine is warm because cold surfaces within the engine and exhaust system may reduce the possibility of combusting some fuel that has been injected to the engine. For these reasons, it may be desirable to provide a way of reducing output of engine hydrocarbon emissions during a cold engine start.

The inventors herein have recognized that it may be desirable to reduce engine emissions of hydrocarbons and have developed a method for operating an engine, comprising: lifting an exhaust valve of a cylinder via a first cam lobe during a cycle of the engine and a lifting the exhaust valve via a second cam lobe during the cycle of the engine.

By at least partially closing an exhaust valve and reopening the exhaust valve after at least partially closing the exhaust valve during a cycle of an engine, it may be possible to provide the technical result of reducing engine hydrocarbon emissions. Specifically, the inventors herein have determined that it may be desirable to at least partially close an exhaust valve during an engine cycle after the exhaust valve has opened during the engine cycle so that flow within the cylinder may be temporarily disrupted. The disruption in flow may cause hydrocarbons to collect near a geometric center of the cylinder rather than the exhaust valve. Consequently, the hydrocarbons may be retained in the cylinder where they may have a chance to combust during a subsequent compression stroke. In this way, emissions of hydrocarbons from an engine may be reduced.

The present description may provide for several advantages. In particular, the present approach may reduce engine hydrocarbon emissions. Further, the present approach may provide an opportunity to combust hydrocarbons during the exhaust stroke to lower engine hydrocarbon emissions. In addition, the approach is suitable for applying during cold engine starts when catalyst efficiency may be low.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
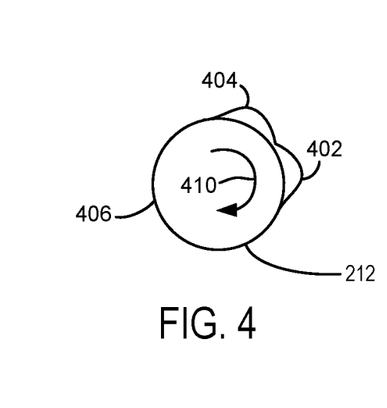
Figure 5:
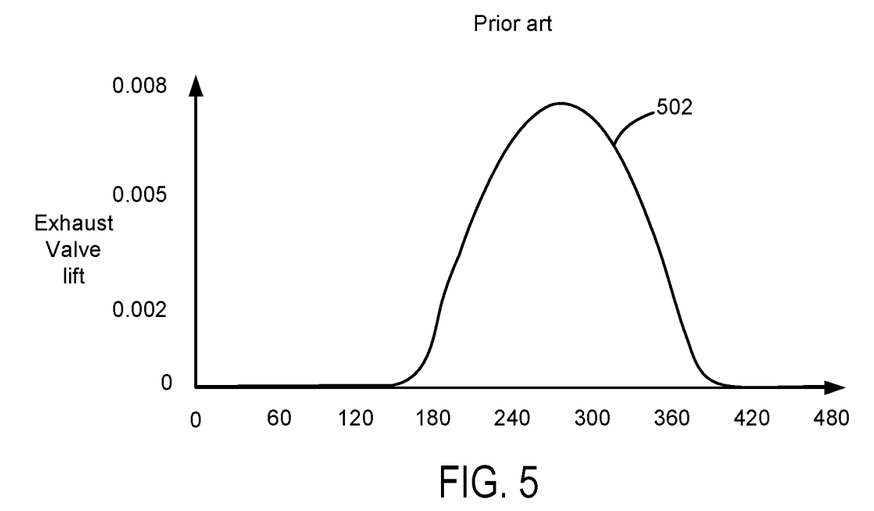
FIG. 5 shows a prior art example of exhaust valve lift.

The following description relates to systems and methods for operating an engine that includes a camshaft with a cam profile that includes two serially arranged lobes. The camshaft and cam profile maybe included with an engine of the type shown in FIG. 1. The camshaft and cam profile may be of the type shown in FIGS. 2-4. A conventional exhaust valve lift profile generated via a conventional cam profile is shown in FIG. 5. Exhaust valve lift profiles generated according to the cam profiles described herein are shown in FIGS. 6-12. A method for operating an engine having the exhaust valve lift profiles disclosed herein is shown in FIG. 13.

Figure 1:
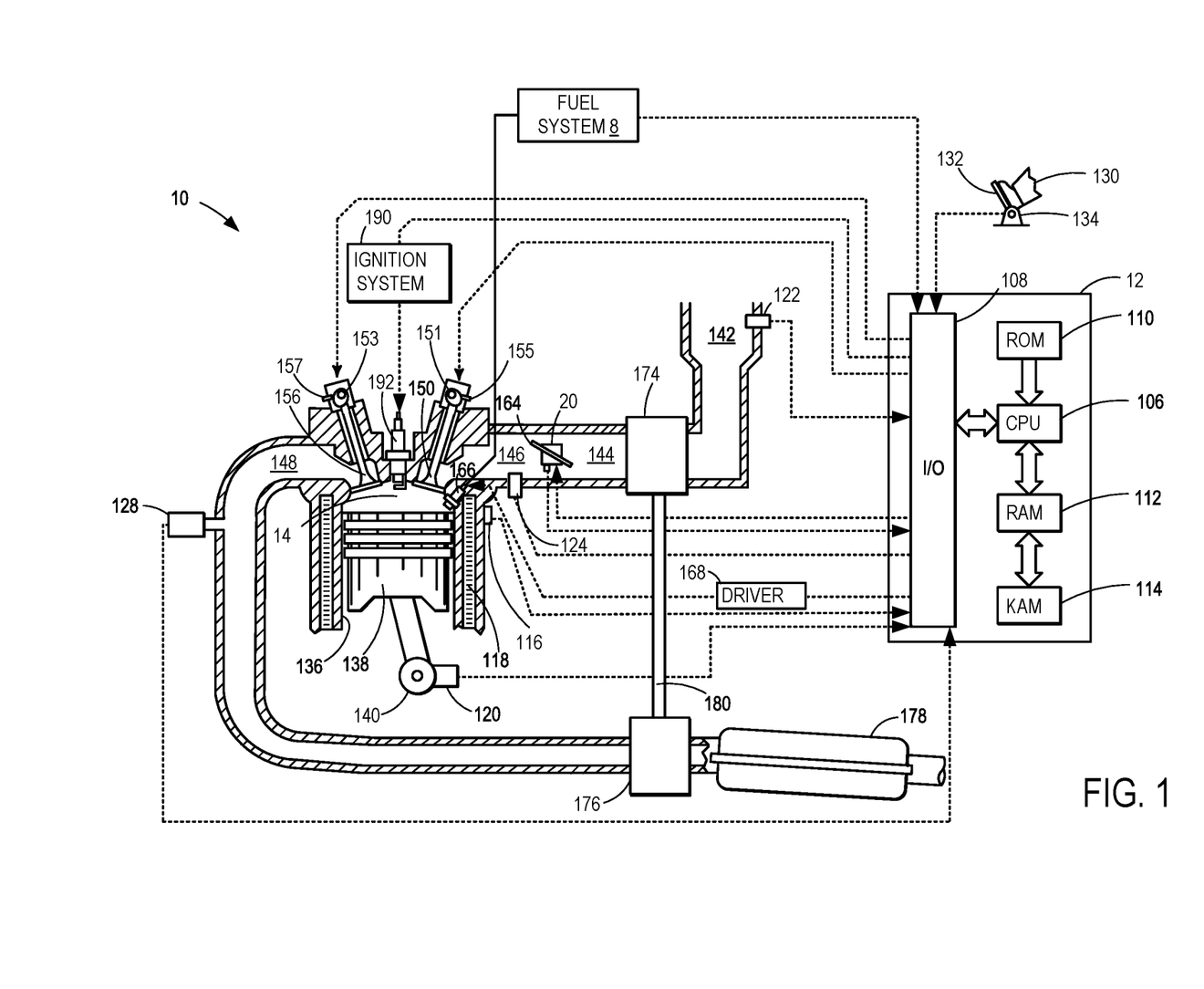
FIG. 1 shows a schematic diagram of one cylinder of an example engine system.

Turning now to the figures, FIG. 1 depicts an example of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake passages 142, 144, and 146. The intake passages may be intake air passages. Intake passage 146 may communicate with other cylinders of engine 10 in addition to cylinder 14. In some examples, one or more of the intake passages may include a boosting device such as a turbocharger or a supercharger. For example, FIG. 1 shows engine 10 including a turbocharger with a compressor 174 arranged between intake passages 142 and 144, and an exhaust turbine 176 arranged along exhaust passage 148. Compressor 174 may be at least partially powered by exhaust turbine 176 via a shaft 180 where the boosting device is a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178 although in some examples, exhaust gas sensor 128 may be positioned downstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake valve 150 (e.g., intake poppet valve) and at least one exhaust valve 156 (e.g., exhaust poppet valve) located at an upper region of cylinder 14. In some examples, each cylinder of engine 10, including cylinder 14, may include at least two intake valves (e.g., intake poppet valves) and at least two exhaust valves (e.g., exhaust poppet valve) located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. Timing of the intake and exhaust valves may be adjusted relative to a position of crankshaft 140 via cam actuator systems 151 and 153. The operation of intake valve 150 and exhaust valve 156 may be determined by valve position sensors (not shown) and/or camshaft position sensors 155 and 157, respectively.

Cylinder 14 can have a compression ratio, which is the ratio of volumes when piston 138 is at bottom center to top center. Conventionally, the compression ratio is in the range of 9:1 to 12:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to a spark advance signal from controller 12, under select operating modes. However, in some examples, spark plug 192 may be omitted, such as where engine 10 may initiate combustion by auto-ignition or by injection of fuel as may be the case with some diesel engines.

In some examples, each cylinder of engine 10 may include one or more fuel injectors for delivering fuel. As a non-limiting example, cylinder 14 is shown including one fuel injector 166. Fuel injector 166 is shown coupled directly to cylinder 14 for injecting fuel directly therein in proportion to the pulse width of a signal received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that, in an alternate example, injector 166 may be a port injector providing fuel into the intake port upstream of cylinder 14. Further, while the example shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof. It should be understood that the head packaging configurations and methods described herein may be used in engines with any suitable fuel delivery mechanisms or systems, e.g., in carbureted engines or other engines with other fuel delivery systems.

Controller 12 includes read only memory 110, a central processing unit 106, random access memory 112, keep alive memory 114, and inputs and outputs 108. Controller 12 may store executable instructions for the methods described herein in non-transitory memory. Controller 12 also receives input from the various sensors previously mentioned as well as crankshaft position sensor 120 and engine temperature sensor 116. Temperature sensor 116 is shown coupled to coolant jacket 118. Controller 12 also receives input from intake manifold pressure sensor 124 and intake air temperature sensor 122.

During operation, each cylinder within engine 10 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine. As such each cylinder may similarly include its own set of intake/exhaust valves, fuel injector(s), spark plug, etc.

Figure 2:
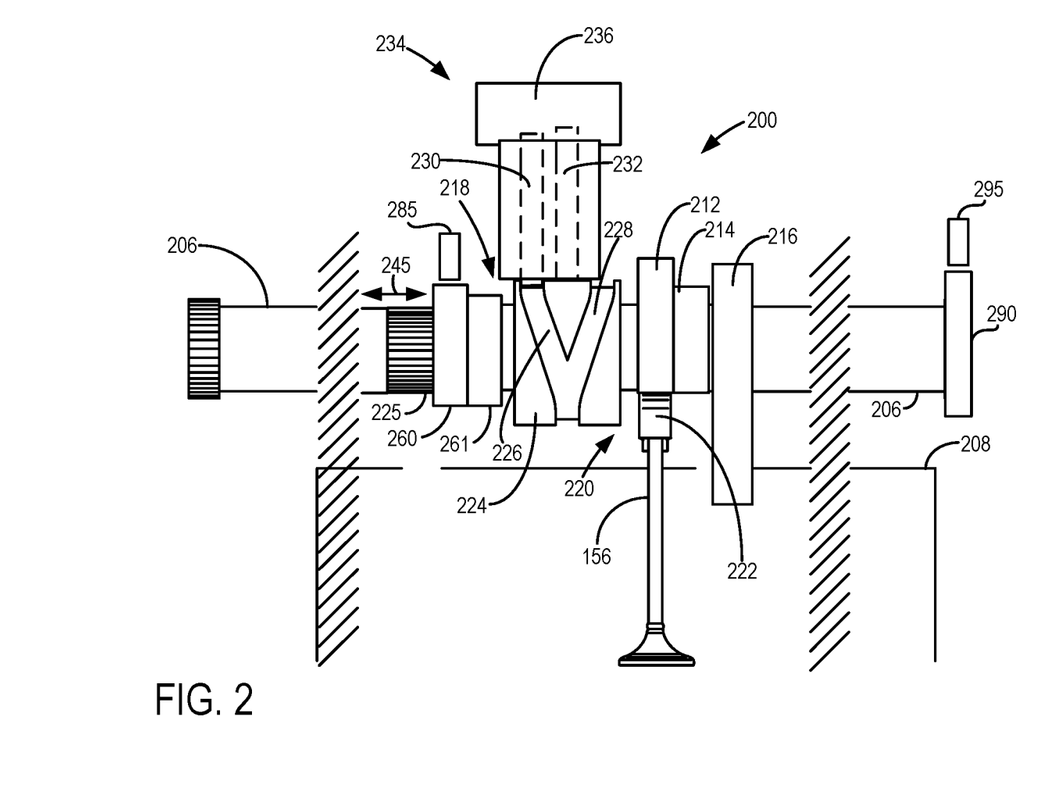
FIGS. 2-4 show two different operating positions for an example cam lobe switching system and two serially arranged cam lobes that may be coupled to a camshaft.

FIG. 2 shows an example cam lobe switching system 200 for application in cam actuator systems 151 and 153 of engine 10 shown in FIG. 1. Cam lobe switching system 200 adjusts a lift and/or valve opening duration of an exhaust valve 156 in response to engine operating conditions. Camshaft 206 is shown positioned above a cylinder head 208 of an engine cylinder bank. Exhaust valve 156 is configured to open and close an exhaust port in a cylinder, such as cylinder 14 shown in FIG. 1. For example, exhaust valve 156 may be actuatable between an open position allowing gas exchange into or out of a cylinder and a closed position substantially blocking gas exchange into or out of the cylinder. It should be understood that though only one valve is shown in FIG. 2; however, engine 10 shown in FIG. 1 may include any number of cylinder valves. For example, engine 10 of FIG. 1 may include any number of cylinders with associated valves and a variety of different cylinder and valve configurations may be used, e.g., V-6, I-4, I-6, V-12, opposed 4, and other engine types.

One or more cam towers or camshaft mounting regions may be coupled to cylinder head 208 to support camshaft 206. For example, cam tower 216 is shown coupled to cylinder head 208 adjacent to exhaust valve 156. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Exhaust valve 156 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., exhaust valve 156, may be operated in different lift modes based on engine operating conditions.

Camshaft 206, which may be an exhaust camshaft, may include a plurality of cams configured to control the opening and closing of the intake valves. For example, FIG. 2 shows a first cam 212 and a second cam 214 positioned above valve 156. In one example, first cam 212 may include two lobes as shown in FIG. 4. The two lobes may be formed in different shapes to generate the exhaust valve lift profiles shown in FIGS. 6-12. Second cam 214 may include only a single lobe to generate an exhaust valve lift profile as shown in FIG. 5.

Exhaust valve 156 includes a mechanism 218 coupled to the camshaft above the valve for adjusting an amount of exhaust valve lift (e.g., a distance between an exhaust valve and an exhaust valve seat) and an exhaust valve lift profile for that exhaust valve by changing a location of cams along the camshaft relative to valve 156. For example, the cam 212 and cam 214 may be slideably attached to the camshaft so that they can slide along the camshaft in an axial direction on a per-cylinder basis. For example, a plurality of cams, e.g., cam 212 and cam 214, positioned above each cylinder valve, e.g., exhaust valve 156, may be slid across the camshaft in directions indicated by arrow 245 to change a cam lobe profile that is coupled to the valve follower, e.g., follower 220 coupled to exhaust valve 156, to change the exhaust valve opening and closing durations and exhaust valve lift amounts. The valve cam follower 220 may include a roller finger follower (RFF) 222 which engages with a cam positioned above exhaust valve 156. For example, in FIG. 2, RFF 222 is shown engaging with full cam 212.

Additional follower elements not shown in FIG. 2 may further include push rods, rocker arms, tappets, etc. Such devices and features may control actuation of the exhaust valves by converting rotational motion of the cams into translational motion of the exhaust valves. In other examples, the exhaust valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 may be coupled to the cam lobes 212 and 214 which are splined to camshaft 206. Outer sleeve 224 may also include a first cam profile indicator 260 and a second cam profile indicator 261. Each of the first and second cam profile indicator may have protrusions (e.g., teeth or a lobe) or depressions to indicate the active cam profile. The number of cam profile indicators may equal the number of cam profiles. The first cam profile indicator 260 rotates with outer sleeve 224 and camshaft 206. Likewise, the second cam profile indicator 261 rotates with outer sleeve 224 and camshaft 206. First cam profile indicator 260 has a different profile or shape with respect to crankshaft position and/or camshaft position than second cam profile 261. Rotation sensing camshaft profile sensor 285 outputs a signal that is indicative of the position of first cam profile indicator 260 or second cam profile indicator 261 depending on the position of sleeve 224. When sleeve 224 is in a first position activating a first cam lobe 212, rotation sensing camshaft profile sensor 285 outputs a signal indicative of a position of first cam profile indicator 260 as camshaft 206 rotates. Camshaft position relative to the engine crankshaft is determined via rotation sensing camshaft position sensor 295 and camshaft position indicator 290.

Figure 3:
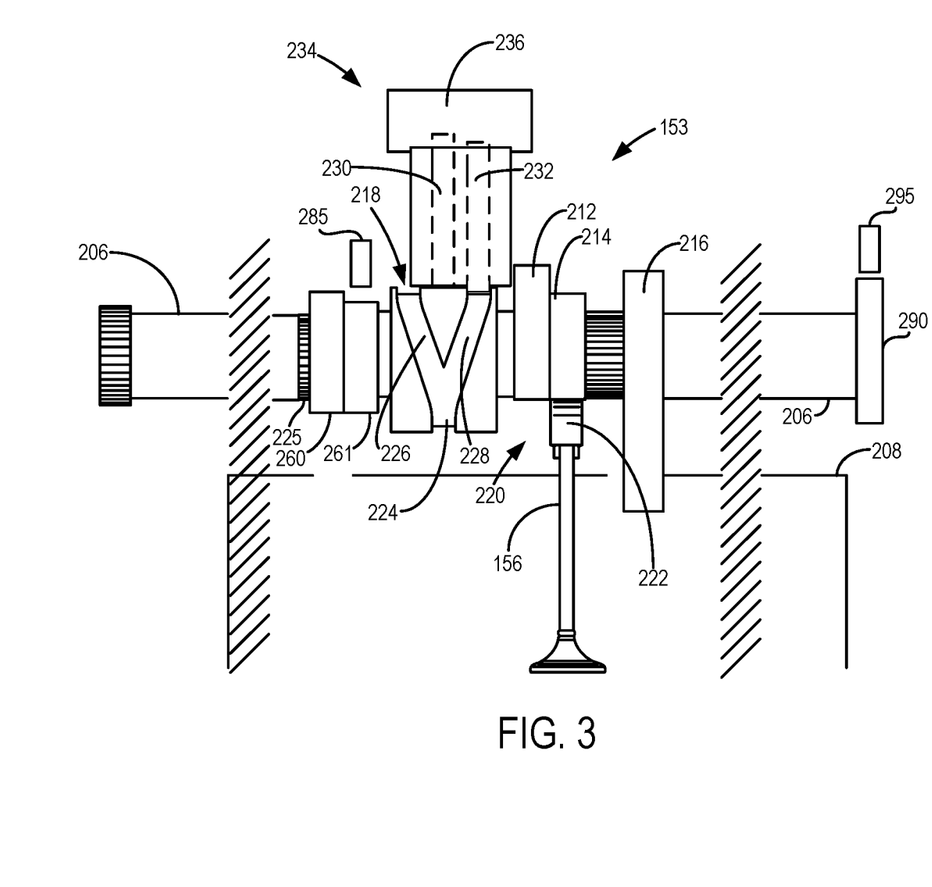

The camshaft may be coupled with a cam phaser that is used to vary the valve timing with respect to crankshaft position. By engaging a pin, e.g., one of the pins 230 or 232, into a grooved hub in the outer sleeve, the axial position of the sleeve can be repositioned so that a different cam lobe engages the cam follower coupled to valve 202 in order to change the lift of the valve. For example, sleeve 224 may include one or more displacing grooves, e.g., grooves 226 and 228, which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for valve 202. Sleeve 224 is shown in a first position while FIG. 3 shows sleeve 224 in a second position. Sleeve 224 follows spline 225 in an axial direction when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while camshaft 206 rotates thereby positioning cam lobe 212 above valve 202 and changing the lift profile. In order to switch back to cam lobe 214, second pin 232 may be deployed into groove 228 which will shift outer sleeve 224 away from cam tower 216 to position cam lobe 214 above valve 202. In some examples, multiple outer sleeves containing lobes may be splined to camshaft 206. For example, outer sleeves may be coupled to cam lobes above every valve in engine 10 or a select number of lobes above the valves.

Actuator pins 230 and 232 are included in a cam lobe switching actuator 234 which adjusts the positions of the pins 230 and 232 in order to switch cam lobes positioned above a valve 202. Cam lobe switching actuator 234 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized, e.g., via a current supplied thereto from the control system, a force is applied to both pins to deploy both pins toward the sleeve.

FIG. 3 shows the same cam lobe switching system 200 as is shown in FIG. 2. The components of cam lobe switching system 200 are identified with the same reference numbers. However, FIG. 3 shows cam sleeve 224 in a second position as determined by deploying pin 232. When sleeve 224 is in the second position activating a second cam lobe 212 as shown, rotation sensing camshaft profile sensor 285 outputs a signal indicative of a position of second cam profile indicator 261 as camshaft 206 rotates. Thus, by adjusting the axial position of sleeve 224, rotation sensing camshaft profile sensor 285 is exposed to different profiles of different rotating cam profile indicators 260 and 261. Camshaft profile sensor 285 outputs different signals depending on whether it is exposed to the rotation of first cam profile indicator 260 or second cam profile indicator 261.

Referring now to FIG. 4, side view of example exhaust cam 212 that includes two lobes is shown. First 402 lobe and second lobe 404 are aligned and serially positioned one after the other so that when exhaust cam rotates as indicted by arrow 410 exhaust valve 156 is lifted twice during a cylinder cycle or an engine cycle (e.g., two revolutions for a four stroke engine). For example, during compression and expansion strokes, base circle 406 of cam 212 sets the exhaust valve lift to zero (e.g., zero lift is where the exhaust valve is fully seated to the exhaust port of the cylinder and not open).

As the engine rotates as indicated by arrow 410, the first lobe 402 of cam 212 sets the exhaust lift to non-zero levels where the exhaust valve is unseated and open. As the engine continues to rotate, lift of first lobe 402 gives way to lift of second lobe 404. Eventually as the engine rotates, cam 212 reaches base circle 406 again and the exhaust valve fully closes. Thus, as cam 212 rotates first lobe 402 provides exhaust valve lift followed by second lobe 404 providing exhaust valve lift. The first 402 and second 404 lobes of cam 212 may be configured to provide the exhaust valve lift profiles as shown in one of FIGS. 6-12.

Thus, the system of FIGS. 1-4 provides for an engine system, comprising: an internal combustion engine including a camshaft, the camshaft including two lobes configured to lift an exhaust valve of a cylinder serially during a cycle of the internal combustion engine; and a controller including executable instructions stored in non-transitory memory that cause the controller to deliver a spark to the cylinder during an exhaust stroke of the cylinder within a predetermined crankshaft angle of where engine speed is highest during the exhaust stroke. The engine system further comprises additional instructions that cause the controller to adjust a timing of the camshaft relative to timing of a crankshaft. The engine system includes where the timing is adjusted to align a lift profile of the camshaft with an engine position as a function of engine speed. The engine system further comprises a third cam lobe configured to lift the exhaust valve of the cylinder once each cycle of the cylinder. The engine system further comprises additional instructions that cause the controller to engage the two lobes and disengage the third cam lobe during a cold engine start. The engine system further comprises additional instructions that cause the controller to engage the third cam lobe and disengage the two lobes after the cold engine start.

Referring now to FIG. 5, a prior art exhaust valve lift profile 502 for a second cam 214 is shown. The vertical axis represents exhaust valve lift for a cylinder and the exhaust valve lift increases in the direction of the vertical axis arrow. The exhaust valve lift is zero at the level of the horizontal axis. The horizontal axis represents engine crankshaft position relative to top-dead-center compression stroke of the cylinder (e.g., 0 crankshaft degrees). The exhaust valve lift profile 502 repeats every 720 crankshaft degrees.

The exhaust valve lift profile 502 is generated via second cam 214, which has a single lobe. In this example, the exhaust valve begins to lift according to profile 502 near 160 crankshaft degrees and it closes near 380 crankshaft degrees. The exhaust lift profile 502 is a value of zero between 420 crankshaft degrees and 720 crankshaft degrees of the cylinder's cycle (e.g., partially shown). Thus, exhaust lift profile 502 indicates that the exhaust valve is open during the engine's exhaust stroke.

Figure 6:
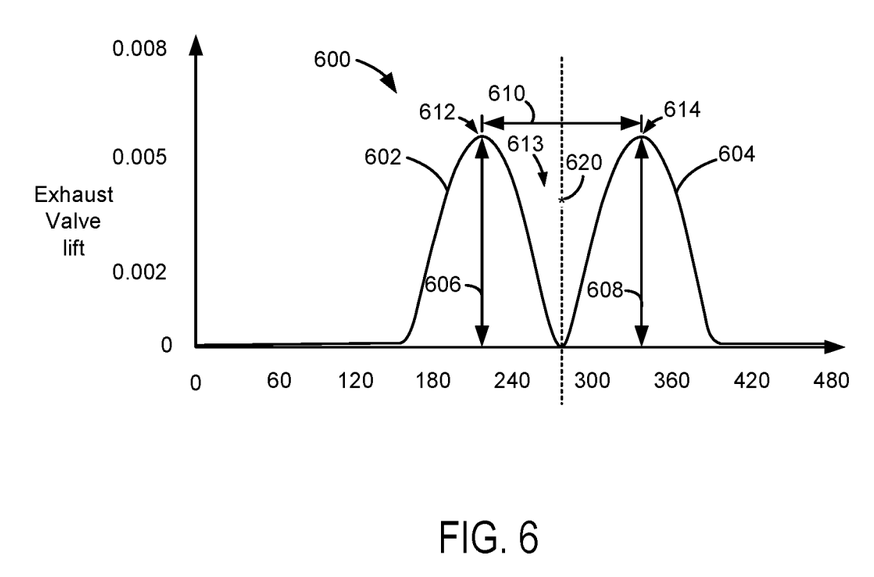
FIGS. 6-12 show prophetic examples of exhaust lift profiles provided by serially arranged cam lobes of a camshaft.

Referring now to FIG. 6, a first exhaust valve lift profile 600 for a second cam 214 is shown. The vertical axis represents exhaust valve lift for a cylinder and the exhaust valve lift increases in the direction of the vertical axis arrow. The exhaust valve lift is zero at the level of the horizontal axis. The horizontal axis represents engine crankshaft position relative to top-dead-center compression stroke of the cylinder (e.g., 0 crankshaft degrees). The exhaust valve lift profile 600 repeats every 720 crankshaft degrees. The exhaust valve opens when the exhaust valve lift is non-zero.

The exhaust valve lift profile 600 is generated via first cam 212, which has two serially arranged lobes. In this example, the first lobe 402 generates a first portion 602 of the lift profile that includes a first exhaust valve opening since 0 crankshaft degrees of exhaust valve lift profile 600 and the first portion of exhaust valve profile ends at about 270 crankshaft degrees. The maximum or peak exhaust valve lift 612 that is generated by the first lobe 402 is indicated by the height of arrow 606. The lift of the first portion 602 decreases from peak 612 to the center of the valley 613 of exhaust valve lift profile 600. In this example, cam timing is adjusted so that exhaust valve lift is zero and the midpoint of valley 613 is where engine speed during the exhaust stroke (e.g., 180 crankshaft degrees to 360 crankshaft degrees) is greatest (e.g., approximately 270 crankshaft degrees). The center of valley 613 may be the central crankshaft position between peak 612 and peak 614. Arrow 610 indicates the crankshaft angular distance between peak 612 and peak 614. Vertical line 620 represents the central crankshaft angle between peak 612 of first portion 602 and peak 614 of second portion 604.

In this example, the second lobe 404 generates a second portion 604 of the lift profile that includes a second exhaust valve opening since 0 crankshaft degrees of exhaust valve lift profile 600 and the second portion of exhaust valve profile ends at about 380 crankshaft degrees. The maximum or peak exhaust valve lift 614 that is generated by the second lobe 404 is indicated by the height of arrow 608. The lift of the second portion 604 decreases from peak 614 to exhaust valve closing, which is near 380 crankshaft degrees.

In some examples, spark 620 is generated in the cylinder to combust hydrocarbons that may cluster near the center of the combustion chamber. The spark may help reduce emissions of hydrocarbons via providing a second opportunity to combust hydrocarbons during a cylinder cycle. In this example, spark 620 is generated when the exhaust valve is fully closed.

Thus, in this example, the exhaust lift profile 600 includes two symmetric peak exhaust valve lift amounts that are generated via two symmetric lobes of cam 212. The exhaust valve fully closes between first peak 612 and second peak 614. Thus, exhaust valve lift profile 600 includes a valley 613 in which exhaust valve lift is reduced to zero.

Figure 7:
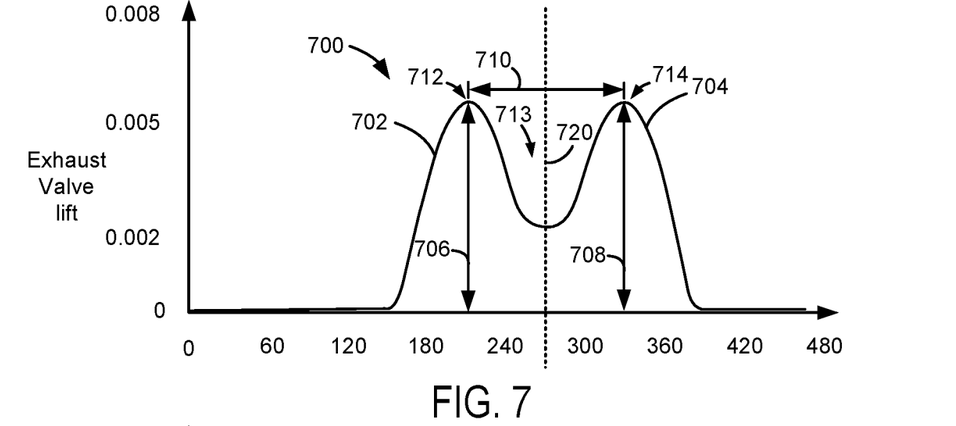

Referring now to FIG. 7, a second exhaust valve lift profile 700 for a second cam 214 is shown. The vertical axis represents exhaust valve lift for a cylinder and the exhaust valve lift increases in the direction of the vertical axis arrow. The exhaust valve lift is zero at the level of the horizontal axis. The horizontal axis represents engine crankshaft position relative to top-dead-center compression stroke of the cylinder (e.g., 0 crankshaft degrees). The exhaust valve lift profile 700 repeats every 720 crankshaft degrees.

The exhaust valve lift profile 700 is generated via first cam 212, which has two serially arranged lobes. In this example, the first lobe 402 generates a first portion 702 of the lift profile that includes a first exhaust valve opening since 0 crankshaft degrees of exhaust valve lift profile 700 and the first portion of exhaust valve profile ends at about 270 crankshaft degrees. The maximum or peak exhaust valve lift 712 that is generated by the first lobe 402 is indicated by the height of arrow 706. The lift of the first portion 702 decreases from peak 712 to the center of the valley 713 of exhaust valve lift profile 700. In this example, cam timing is adjusted so that exhaust valve lift is non-zero and the midpoint of valley 713 is where engine speed during the exhaust stroke (e.g., 180 crankshaft degrees to 360 crankshaft degrees) is greatest (e.g., approximately 270 crankshaft degrees). The center of valley 713 may be the central crankshaft position between peak 712 and peak 714. Arrow 710 indicates the crankshaft angular distance between peak 712 and peak 714. Vertical line 720 represents the central crankshaft angle between peak 712 of first portion 702 and peak 714 of second portion 704.

In this example, the second lobe 404 generates a second portion 704 of the lift profile that includes a second exhaust valve opening since 0 crankshaft degrees of exhaust valve lift profile 700 and the second portion of exhaust valve profile ends at about 380 crankshaft degrees. The maximum or peak exhaust valve lift 714 that is generated by the second lobe 404 is indicated by the height of arrow 708. The lift of the second portion 704 decreases from peak 714 to exhaust valve closing, which is near 380 crankshaft degrees.

Thus, in this example, the exhaust lift profile 700 includes two symmetric peak exhaust valve lift amounts that are generated via two symmetric lobes of cam 212. The exhaust valve does not fully close between first peak 712 and second peak 714. This exhaust valve lift profile 700 includes a valley 713 in which exhaust valve lift is reduced to a non-zero value before it begins to increase a second time during lift profile 700.

Figure 8:
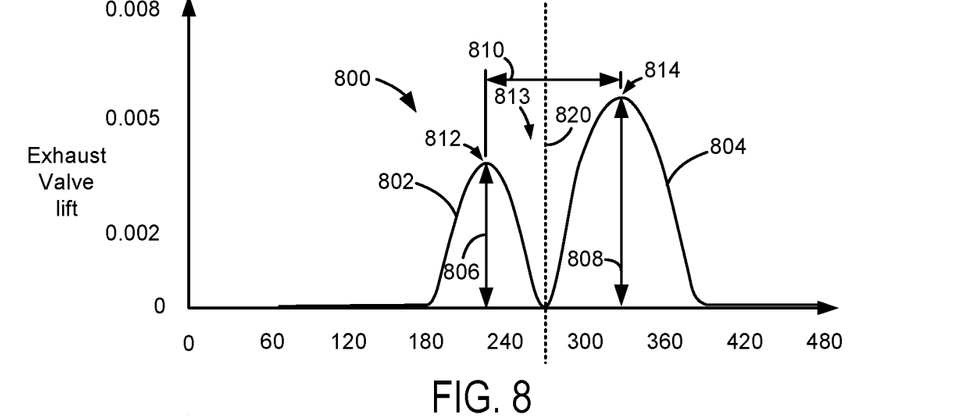

Referring now to FIG. 8, a second exhaust valve lift profile 800 for a second cam 214 is shown. The vertical axis represents exhaust valve lift for a cylinder and the exhaust valve lift increases in the direction of the vertical axis arrow. The exhaust valve lift is zero at the level of the horizontal axis. The horizontal axis represents engine crankshaft position relative to top-dead-center compression stroke of the cylinder (e.g., 0 crankshaft degrees). The exhaust valve lift profile 800 repeats every 720 crankshaft degrees.

The exhaust valve lift profile 800 is generated via first cam 212, which has two serially arranged lobes. In this example, the first lobe 402 generates a first portion 802 of the lift profile that includes a first exhaust valve opening since 0 crankshaft degrees of exhaust valve lift profile 800 and the first portion of exhaust valve profile ends at about 270 crankshaft degrees. The maximum or peak exhaust valve lift 812 that is generated by the first lobe 402 is indicated by the height of arrow 806. The lift of the first portion 802 decreases from peak 812 to the center of the valley 813 of exhaust valve lift profile 800. In this example, cam timing is adjusted so that exhaust valve lift is zero and the midpoint of valley 813 is where engine speed during the exhaust stroke (e.g., 180 crankshaft degrees to 360 crankshaft degrees) is greatest (e.g., approximately 270 crankshaft degrees). The center of valley 813 may be the central crankshaft position between peak 812 and peak 814. Arrow 810 indicates the crankshaft angular distance between peak 812 and peak 814. Vertical line 820 represents the central crankshaft angle between peak 812 of first portion 802 and peak 814 of second portion 804.

In this example, the second lobe 404 generates a second portion 804 of the lift profile that includes a second exhaust valve opening since 0 crankshaft degrees of exhaust valve lift profile 800 and the second portion of exhaust valve profile ends at about 380 crankshaft degrees. The maximum or peak exhaust valve lift 814 that is generated by the second lobe 404 is indicated by the height of arrow 808. The lift of the second portion 804 decreases from peak 814 to exhaust valve closing, which is near 380 crankshaft degrees. The maximum exhaust valve lift of second portion 804 is greater than the maximum exhaust valve lift of first portion 802. In addition the valve opening duration of the second lobe of the cam (e.g., 270-370 crankshaft degrees) is greater than the valve opening duration of the first lobe of the cam (e.g., 180-270 crankshaft degrees).

Thus, in this example, the exhaust lift profile 800 includes two asymmetric peak exhaust valve lift amounts that are generated via two asymmetric lobes of cam 212. The exhaust valve fully closes between first peak 812 and second peak 814. This exhaust valve lift profile 800 includes a valley 813 in which exhaust valve lift is reduced to zero before it begins to increase a second time during lift profile 800.

Figure 9:
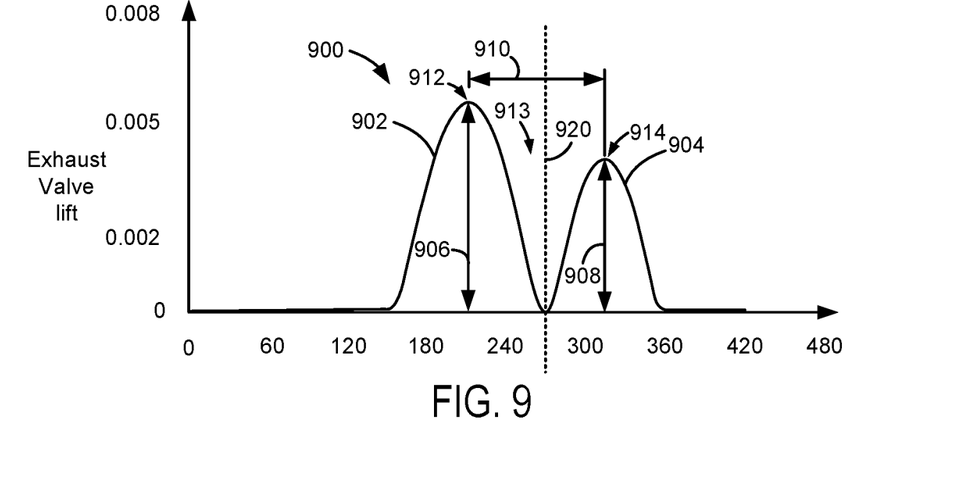

Referring now to FIG. 9, a second exhaust valve lift profile 900 for a second cam 214 is shown. The vertical axis represents exhaust valve lift for a cylinder and the exhaust valve lift increases in the direction of the vertical axis arrow. The exhaust valve lift is zero at the level of the horizontal axis. The horizontal axis represents engine crankshaft position relative to top-dead-center compression stroke of the cylinder (e.g., 0 crankshaft degrees). The exhaust valve lift profile 900 repeats every 720 crankshaft degrees.

The exhaust valve lift profile 900 is generated via first cam 212, which has two serially arranged lobes. In this example, the first lobe 402 generates a first portion 902 of the lift profile that includes a first exhaust valve opening since 0 crankshaft degrees of exhaust valve lift profile 900 and the first portion of exhaust valve profile ends at about 270 crankshaft degrees. The maximum or peak exhaust valve lift 912 that is generated by the first lobe 402 is indicated by the height of arrow 906. The lift of the first portion 902 decreases from peak 912 to the center of the valley 913 of exhaust valve lift profile 900. In this example, cam timing is adjusted so that exhaust valve lift is zero and the midpoint of valley 913 is where engine speed during the exhaust stroke (e.g., 180 crankshaft degrees to 360 crankshaft degrees) is greatest (e.g., approximately 270 crankshaft degrees). The center of valley 913 may be the central crankshaft position between peak 912 and peak 914. Arrow 910 indicates the crankshaft angular distance between peak 912 and peak 914. Vertical line 920 represents the central crankshaft angle between peak 912 of first portion 902 and peak 914 of second portion 904.

In this example, the second lobe 404 generates a second portion 904 of the lift profile that includes a second exhaust valve opening since 0 crankshaft degrees of exhaust valve lift profile 900 and the second portion of exhaust valve profile ends at about 380 crankshaft degrees. The maximum or peak exhaust valve lift 814 that is generated by the second lobe 404 is indicated by the height of arrow 908. The lift of the second portion 904 decreases from peak 914 to exhaust valve closing, which is near 380 crankshaft degrees. The maximum exhaust valve lift of second portion 904 is less than the maximum exhaust valve lift of first portion 902. In addition the valve opening duration of the second lobe of the cam (e.g., 270-360 crankshaft degrees) is less than the valve opening duration of the first lobe of the cam (e.g., 160-270 crankshaft degrees).

Thus, in this example, the exhaust lift profile 900 includes two asymmetric peak exhaust valve lift amounts that are generated via two asymmetric lobes of cam 212. The exhaust valve fully closes between first peak 912 and second peak 914. This exhaust valve lift profile 900 includes a valley 913 in which exhaust valve lift is reduced to zero before it begins to increase a second time during lift profile 900.

Figure 10:
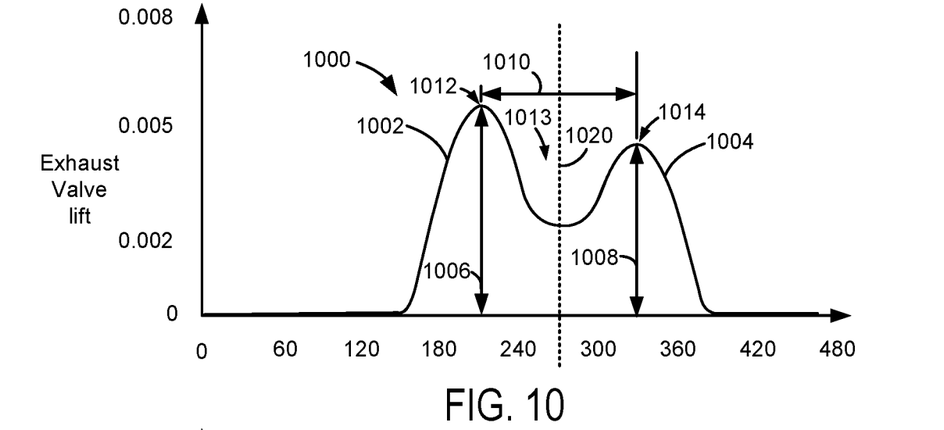

Referring now to FIG. 10, a second exhaust valve lift profile 1000 for a second cam 214 is shown. The vertical axis represents exhaust valve lift for a cylinder and the exhaust valve lift increases in the direction of the vertical axis arrow. The exhaust valve lift is zero at the level of the horizontal axis. The horizontal axis represents engine crankshaft position relative to top-dead-center compression stroke of the cylinder (e.g., 0 crankshaft degrees). The exhaust valve lift profile 1000 repeats every 720 crankshaft degrees.

The exhaust valve lift profile 1000 is generated via first cam 212, which has two serially arranged lobes. In this example, the first lobe 402 generates a first portion 1002 of the lift profile that includes a first exhaust valve opening since 0 crankshaft degrees of exhaust valve lift profile 1000 and the first portion of exhaust valve profile ends at about 270 crankshaft degrees. The maximum or peak exhaust valve lift 1012 that is generated by the first lobe 402 is indicated by the height of arrow 1006. The lift of the first portion 1002 decreases from peak 1012 to the center of the valley 1013 of exhaust valve lift profile 1000. In this example, cam timing is adjusted so that exhaust valve lift is not zero and the midpoint of valley 1013 is where engine speed during the exhaust stroke (e.g., 180 crankshaft degrees to 360 crankshaft degrees) is greatest (e.g., approximately 270 crankshaft degrees). The center of valley 1013 may be the central crankshaft position between peak 1012 and peak 1014. Arrow 1010 indicates the crankshaft angular distance between peak 1012 and peak 1014. Vertical line 1020 represents the central crankshaft angle between peak 1012 of first portion 1002 and peak 1014 of second portion 1004.

In this example, the second lobe 404 generates a second portion 1004 of the lift profile that includes a second exhaust valve opening since 0 crankshaft degrees of exhaust valve lift profile 1000 and the second portion of exhaust valve profile ends at about 380 crankshaft degrees. The maximum or peak exhaust valve lift 1014 that is generated by the second lobe 404 is indicated by the height of arrow 1008. The lift of the second portion 1004 decreases from peak 1014 to exhaust valve closing, which is near 380 crankshaft degrees. The maximum exhaust valve lift of second portion 1004 is less than the maximum exhaust valve lift of first portion 1002.

Thus, in this example, the exhaust lift profile 1000 includes two asymmetric peak exhaust valve lift amounts that are generated via two asymmetric lobes of cam 212. The exhaust valve does not fully close between first peak 1012 and second peak 1014. This exhaust valve lift profile 1000 includes a valley 1013 in which exhaust valve lift is reduced to a non-zero value before it begins to increase a second time during lift profile 1000.

Figure 11:
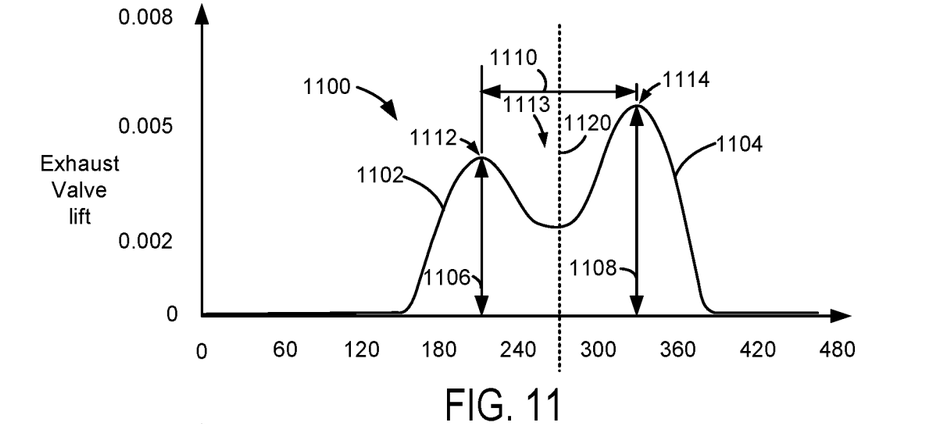

Referring now to FIG. 11, a second exhaust valve lift profile 1100 for a second cam 214 is shown. The vertical axis represents exhaust valve lift for a cylinder and the exhaust valve lift increases in the direction of the vertical axis arrow. The exhaust valve lift is zero at the level of the horizontal axis. The horizontal axis represents engine crankshaft position relative to top-dead-center compression stroke of the cylinder (e.g., 0 crankshaft degrees). The exhaust valve lift profile 1100 repeats every 720 crankshaft degrees.

The exhaust valve lift profile 1100 is generated via first cam 212, which has two serially arranged lobes. In this example, the first lobe 402 generates a first portion 1102 of the lift profile that includes a first exhaust valve opening since 0 crankshaft degrees of exhaust valve lift profile 1100 and the first portion of exhaust valve profile ends at about 270 crankshaft degrees. The maximum or peak exhaust valve lift 1112 that is generated by the first lobe 402 is indicated by the height of arrow 1106. The lift of the first portion 1102 decreases from peak 1112 to the center of the valley 1113 of exhaust valve lift profile 1100. In this example, cam timing is adjusted so that exhaust valve lift is not zero and the midpoint of valley 1113 is where engine speed during the exhaust stroke (e.g., 180 crankshaft degrees to 360 crankshaft degrees) is greatest (e.g., approximately 270 crankshaft degrees). The center of valley 1113 may be the central crankshaft position between peak 1112 and peak

1114. Arrow 1110 indicates the crankshaft angular distance between peak 1112 and peak 1114. Vertical line 1120 represents the central crankshaft angle between peak 1112 of first portion 1102 and peak 1114 of second portion 1104.

In this example, the second lobe 404 generates a second portion 1104 of the lift profile that includes a second exhaust valve opening since 0 crankshaft degrees of exhaust valve lift profile 1100 and the second portion of exhaust valve profile ends at about 380 crankshaft degrees. The maximum or peak exhaust valve lift 1114 that is generated by the second lobe 404 is indicated by the height of arrow 1108. The lift of the second portion 1104 decreases from peak 1114 to exhaust valve closing, which is near 380 crankshaft degrees. The maximum exhaust valve lift of second portion 1104 is greater than the maximum exhaust valve lift of first portion 1102.

Thus, in this example, the exhaust lift profile 1100 includes two asymmetric peak exhaust valve lift amounts that are generated via two asymmetric lobes of cam 212. The exhaust valve does not fully close between first peak 1112 and second peak 1114. This exhaust valve lift profile 1100 includes a valley 1113 in which exhaust valve lift is reduced to a non-zero value before it begins to increase a second time during lift profile 1100.

Figure 12:
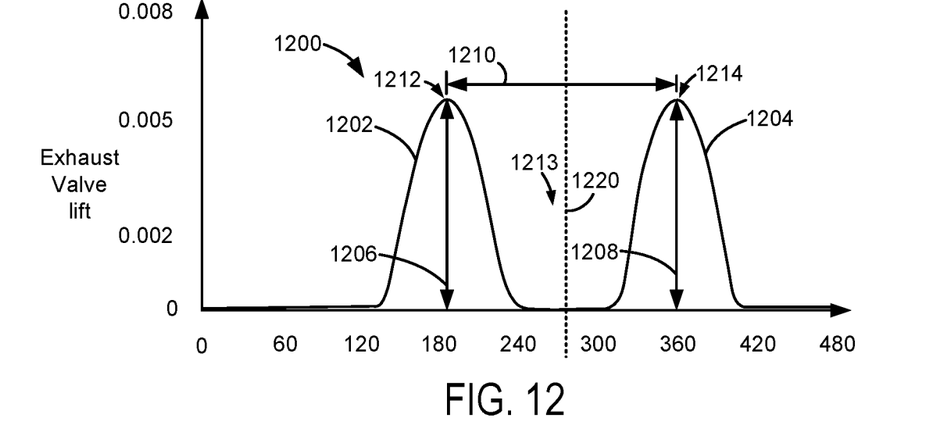
Figure 13:
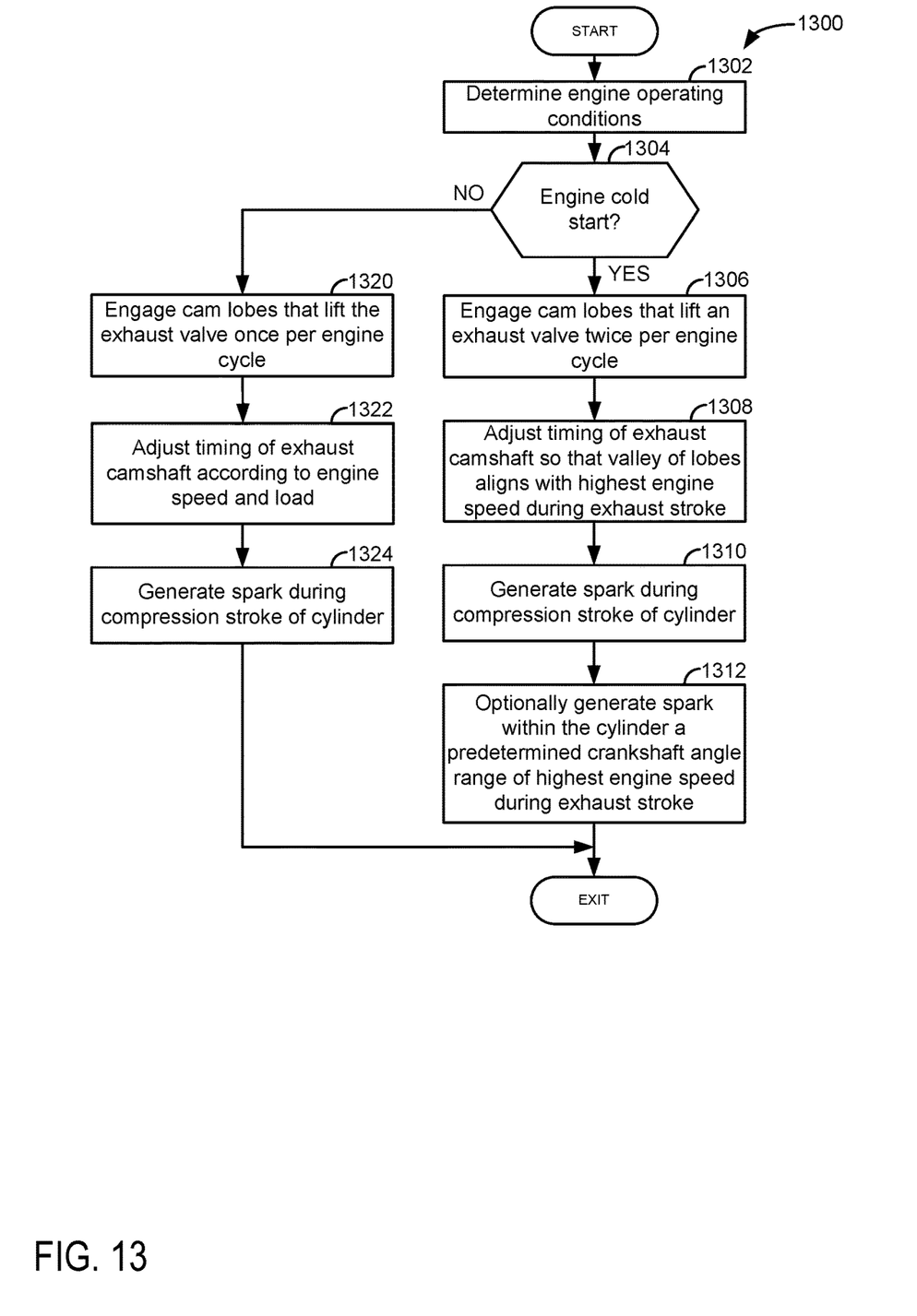
FIG. 13 shows an example method for operating an engine having two serially arranged cam lobes.

Referring now to FIG. 12, a first exhaust valve lift profile 1200 for a second cam 214 is shown. The vertical axis represents exhaust valve lift for a cylinder and the exhaust valve lift increases in the direction of the vertical axis arrow. The exhaust valve lift is zero at the level of the horizontal axis. The horizontal axis represents engine crankshaft position relative to top-dead-center compression stroke of the cylinder (e.g., 0 crankshaft degrees). The exhaust valve lift profile 1200 repeats every 720 crankshaft degrees.

The exhaust valve lift profile 1200 is generated via first cam 212, which has two serially arranged lobes. In this example, the first lobe 402 generates a first portion 1202 of the lift profile that includes a first exhaust valve opening since 0 crankshaft degrees of exhaust valve lift profile 1200 and the first portion of exhaust valve profile ends at about 270 crankshaft degrees. The maximum or peak exhaust valve lift 1212 that is generated by the first lobe 1202 is indicated by the height of arrow 1206. The lift of the first portion 1202 decreases from peak 1212 to the center of the valley 1213 of exhaust valve lift profile 1200. In this example, cam timing is adjusted so that exhaust valve lift is zero and the midpoint of valley 1213 is where engine speed during the exhaust stroke (e.g., 180 crankshaft degrees to 360 crankshaft degrees) is greatest (e.g., approximately 270 crankshaft degrees). The center of valley 1213 may be the central crankshaft position between peak 1212 and peak 1214. Arrow 1210 indicates the crankshaft angular distance between peak 1212 and peak 1214. Vertical line 1220 represents the central crankshaft angle between peak 1212 of first portion 1202 and peak 1214 of second portion 1204.

In this example, the second lobe 404 generates a second portion 1204 of the lift profile that includes a second exhaust valve opening since 0 crankshaft degrees of exhaust valve lift profile 1200 and the second portion of exhaust valve profile ends at about 380 crankshaft degrees. The maximum or peak exhaust valve lift 1214 that is generated by the second lobe 404 is indicated by the height of arrow 1208. The lift of the second portion 1204 decreases from peak 1214 to exhaust valve closing, which is near 380 crankshaft degrees. The exhaust valve lift profile shown in FIG. 12 is similar to the exhaust valve lift profile shown in FIG. 6; however, exhaust profile 1200 is at zero lift for a longer crankshaft angular interval than exhaust valve lift profile 600. Such exhaust valve operation may further drive hydrocarbons toward a center of a cylinder so that they may have less possibility of being ejected from the cylinder.

Thus, in this example, the exhaust lift profile 1200 includes two symmetric peak exhaust valve lift amounts that are generated via two symmetric lobes of cam 212. The exhaust valve fully closes between first peak 1212 and second peak 1214. Thus, exhaust valve lift profile 1200 includes a valley 1213 in which exhaust valve lift is reduced to zero.

Referring now to FIG. 13, a method for operating an engine is shown. The method of FIG. 13 may be stored as executable instructions in non-transitory memory of the system shown in FIGS. 1-4. The method of FIG. 13 may be performed using one of the exhaust valve lift profiles shown in FIGS. 6-12. At least portions of the method of FIG. 13 may be performed via the controller described herein to change an operating state of an engine or engine actuator.

At 1302, method 1300 determines engine operating conditions. Engine operating conditions may include but are not limited to engine speed, engine load, driver demand torque, engine temperature, engine temperature, and vehicle speed. Method 1300 proceeds to 1304 after engine operating conditions are determined.

At 1304, method 1300 judges if the engine is operating in cold start conditions. Cold start engine conditions may include but are not limited to engine temperature less than a threshold temperature, an amount of time since a most recent engine start being less than a threshold amount of time, and catalyst temperature being less than a threshold temperature. If method 1300 judges that an engine is operating in cold start conditions, the answer is yes and method 1300 proceeds to 1306. Otherwise, the answer is no and method 1300 proceeds to 1320.

At 1306, method 1300 engages a cam including two lobes (e.g., 212) that lift an exhaust valve twice serially during a cycle of an engine. In one example, the cam lobes may provide one of the exhaust valve lift profiles that are shown in FIGS. 6-12. Method 1300 may engage the cam so that the exhaust valve is lifted via the engaged cam. Method 1300 proceeds to 1308.

At 1308, method 1300 adjusts timing of the exhaust cam and cam lobes such that the valley that is between the two cam lobes is aligned with the crankshaft angle during the cylinder's exhaust stroke where engine speed is highest. By aligning the valley between cam lobe peak lifts, it may be possible to reduce an amount of hydrocarbons that may be ejected from a cylinder during cold engine starting. Method 1300 proceeds to 1310.

At 1310, method 1300 generates a spark during a compression stroke of the cylinder so that the combusted exhaust gases generate torque via the engine. Method 1300 proceeds to 1312.

At 1312, method 1300 optionally delivers spark to the cylinder of the engine during the cylinder's exhaust stroke. The spark may be delivered during the cylinder's exhaust stroke when exhaust valve lift is less than a peak exhaust valve lift amount. For example, the spark may be delivered during a valley between lobes of an exhaust cam. In one example, the spark may be generated at a crankshaft angle at which the cylinder receiving the spark is on its exhaust stroke and at the crankshaft angle during the exhaust stroke where engine speed is greatest. By generating a spark, it may be possible to combust hydrocarbons in a cylinder when the hydrocarbons are most concentrated about a spark plug. In this way, the possibility of combusting the hydrocarbons may be increased. Method 1300 proceeds to exit.

At 1320, method 1300 engages a cam including one lobe (e.g., 214) that lifts an exhaust valve once during a cycle of an engine. In one example, the cam lobe may provide the exhaust valve lift profile shown in FIG. 5. Method 1300 may engage the cam so that the exhaust valve is lifted via the engaged cam. Method 1300 proceeds to 1322.

At 1322, method 1300 adjusts timing of the exhaust cam responsive to engine speed and load. Adjusting the exhaust cam with respect to engine speed and load, it may be possible to improve engine performance and emissions. Method 1300 proceeds to 1324.

At 1324, method 1300 generates a spark during a compression stroke of the cylinder so that the combusted exhaust gases generate torque via the engine. Method 1300 proceeds to exit.

In this way, exhaust cam profiles may be switched to improve engine emissions. Further, spark may be generated during an exhaust stroke of a cylinder to increase the possibility of combusting hydrocarbons that may not have combusted during a first combustion event of the cylinder during the cylinder's cycle.

The method of FIG. 13 provides for a method for operating an engine, comprising: lifting an exhaust valve of a cylinder via a first cam lobe during a cycle of the engine and a lifting the exhaust valve via a second cam lobe during the cycle of the engine. The method includes where the first cam lobe lifts the exhaust valve during a compression or an exhaust stroke of the cylinder, and where the second cam lobe lifts the exhaust valve during the exhaust stroke of the cylinder. The method includes where an amount of lift provided via the first cam lobe and the second cam lobe is not reduced to zero between a peak of the first cam lobe and a peak of the second cam lobe. The method includes where an amount of lift provided via the first cam lobe and the second cam lobe is reduced to zero between a peak of the first cam lobe and a peak of the second cam lobe. The method includes where a total amount of lift provided via the first cam lobe is greater than a total amount of lift provided via the second cam lobe. The method includes where a total amount of lift provided via the first cam lobe is less than a total amount of lift provided via the second cam lobe. The method includes where a duration of lift provided via the first cam lobe is greater than a duration of lift provided via the second cam lobe. The method includes where a duration of lift provided via the first cam lobe is less than a duration of lift provided via the second cam lobe.

Thus, the method of FIG. 13 also provides for a method for operating an engine, comprising: lifting an exhaust valve of a cylinder via a first cam lobe during a cycle of the engine and a lifting the exhaust valve via a second cam lobe during the cycle of the engine, where the first cam lobe and the second cam lobe are part of a camshaft assembly; and adjusting timing of the camshaft assembly as a function of engine speed during an exhaust stroke of the cylinder. The method includes where adjusting timing of the camshaft assembly includes adjusting a camshaft position at which the second cam lobe begins to lift the exhaust valve relative to crankshaft position. The method further comprises delivering a spark within a predetermined crankshaft angle range during an exhaust stroke of the cylinder. The method includes where the predetermined crankshaft angle range is a crankshaft angle range where a speed of the engine is greatest during the exhaust stroke of the cylinder. The method includes where a total lift of the first cam lobe is greater than a total lift of the second cam lobe. The method includes where a duration of the first cam lobe is greater than a duration of the second cam lobe.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
    lifting an exhaust valve of a cylinder via a first cam lobe during a cycle of the engine and a lifting the exhaust valve via a second cam lobe during the cycle of the engine;
    where the cycle is during a cold engine start process; and
    where the first cam lobe lifts the exhaust valve during an expansion or an exhaust stroke of the cylinder, and the second cam lobe lifts the exhaust valve during the exhaust stroke of the cylinder.

2. The method of claim 1, where an amount of lift provided via the first cam lobe and the second cam lobe is not reduced to zero between a peak of the first cam lobe and a peak of the second cam lobe.

3. The method of claim 1, where an amount of lift provided via the first cam lobe and the second cam lobe is reduced to zero between a peak of the first cam lobe and a peak of the second cam lobe.

4. The method of claim 1, where a total amount of lift provided via the first cam lobe is greater than a total amount of lift provided via the second cam lobe.

5. The method of claim 1, where a total amount of lift provided via the first cam lobe is less than a total amount of lift provided via the second cam lobe.

6. The method of claim 1, where a duration of lift provided via the first cam lobe is greater than a duration of lift provided via the second cam lobe.

7. The method of claim 1, where a duration of lift provided via the first cam lobe is less than a duration of lift provided via the second cam lobe.

8. An engine system, comprising:
    an internal combustion engine including a camshaft, the camshaft including two lobes configured to lift an exhaust valve of a cylinder serially during a cycle of the internal combustion engine; and
    a controller including executable instructions stored in non-transitory memory that cause the controller to deliver a spark to the cylinder during an exhaust stroke of the cylinder during the cycle and within a predetermined crankshaft angle of where engine speed is highest during the exhaust stroke.

9. The engine system of claim 8, further comprising additional instructions that cause the controller to adjust a timing of the camshaft relative to timing of a crankshaft.

10. The engine system of claim 9, where the timing is adjusted to align a lift profile of the camshaft with an engine position as a function of engine speed.

11. The engine system of claim 8, further comprising a third cam lobe configured to lift the exhaust valve of the cylinder once each cycle of the cylinder.

12. The engine system of claim 11, further comprising additional instructions that cause the controller to engage the two lobes and disengage the third cam lobe during a cold engine start.

13. The engine system of claim 12, further comprising additional instructions that cause the controller to engage the third cam lobe and disengage the two lobes after the cold engine start.

14. A method for operating an engine, comprising:
lifting an exhaust valve of a cylinder via a first cam lobe during a cycle of the engine and lifting the exhaust valve via a second cam lobe during the cycle of the engine, where the first cam lobe and the second cam lobe are part of a camshaft assembly;
adjusting timing of the camshaft assembly as a function of engine speed during an exhaust stroke of the cylinder; and
delivering a spark within a predetermined crankshaft angle range during an exhaust stroke of the cylinder during the cycle.

15. The method of claim 14, where adjusting timing of the camshaft assembly includes adjusting a camshaft position at which the second cam lobe begins to lift the exhaust valve relative to crankshaft position.

16. The method of claim 14, where the predetermined crankshaft angle range is a crankshaft angle range where a speed of the engine is greatest during the exhaust stroke of the cylinder.

17. The method of claim 14, where a total lift of the first cam lobe is greater than a total lift of the second cam lobe.

18. The method of claim 14, where a duration of the first cam lobe is greater than a duration of the second cam lobe.

* * * * *